(12) United States Patent
Chow et al.

(10) Patent No.: US 10,860,775 B1
(45) Date of Patent: Dec. 8, 2020

(54) CLOCK PIN TO CLOCK TAP ASSIGNMENT BASED ON CIRCUIT DEVICE CONNECTIVITY

(71) Applicant: Cadence Design Systems, Inc., San Jose, CA (US)

(72) Inventors: Wing-Kai Chow, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 11 days.

(21) Appl. No.: 16/384,668

(22) Filed: Apr. 15, 2019

(51) Int. Cl.
| | |
|---|---|
| *G06F 30/30* | (2020.01) |
| *G06F 30/398* | (2020.01) |
| *G06F 30/34* | (2020.01) |
| *G06F 111/04* | (2020.01) |
| *G06F 119/12* | (2020.01) |

(52) U.S. Cl.
CPC ............ *G06F 30/398* (2020.01); *G06F 30/34* (2020.01); *G06F 2111/04* (2020.01); *G06F 2119/12* (2020.01)

(58) Field of Classification Search
CPC ............... G06F 30/398; G06F 2111/04; G06F 2119/12; G06F 30/34
USPC ....................................................... 716/113
See application file for complete search history.

(56) References Cited

U.S. PATENT DOCUMENTS

| | | | |
|---|---|---|---|
| 8,572,532 B1 | 10/2013 | Singh et al. | |
| 8,631,378 B2 | 1/2014 | Lasher et al. | |
| 8,799,846 B1 | 8/2014 | Berry et al. | |
| 8,806,413 B2 | 8/2014 | Shaikh et al. | |
| 8,887,114 B2 | 11/2014 | Hill et al. | |
| 10,289,775 B1 | 5/2019 | Wilson et al. | |
| 2009/0064067 A1* | 3/2009 | Liu ..................... | G06F 30/3312 716/113 |
| 2012/0176157 A1 | 7/2012 | Peng | |
| 2013/0219352 A1 | 8/2013 | Ishikawa et al. | |
| 2014/0282339 A1 | 9/2014 | Hill et al. | |

OTHER PUBLICATIONS

U.S. Appl. No. 15/694,309, Examiner Interview Summary dated Jan. 30, 2019, 3 pgs.
U.S. Appl. No. 15/694,309, Non Final Office Action dated Nov. 15, 2018, 14 pgs.

(Continued)

*Primary Examiner* — Jack Chiang
*Assistant Examiner* — Brandon Bowers
(74) *Attorney, Agent, or Firm* — Schwegman Lundberg & Woessner, P.A.

(57) ABSTRACT

Various embodiments provide for assigning a clock pin to a clock tap within a circuit design based on connectivity between circuit devices of the circuit design. For some embodiments, an initial clock tap assignment, between a clock tap of a circuit design and a clock pin of the circuit design, is accessed as input, and a modified clock tap assignment (between the clock tap and another clock pin of the circuit design) can be generated based on one or more of the following considerations: a clock tap assignment should try to assign clock pins of connected circuit devices to the same clock tap; a clock tap assignment should try to assign clock pins of connected circuit devices having the critical timing problems; a clock tap assignment should try to assign clock pins of connected circuit devices to clock taps with longer common path length.

20 Claims, 11 Drawing Sheets

(56) References Cited

OTHER PUBLICATIONS

U.S. Appl. No. 15/694,309, Notice of Allowance dated Mar. 6, 2019, 5 pgs.
U.S. Appl. No. 15/694,309, Response to Non Final Office Action dated Nov. 15, 2018, 10 pgs.

* cited by examiner

200

- 202 ACCESS INITIAL CLOCK TAP ASSIGNMENT DATA DESCRIBING INITIAL SET OF CLOCK-TAP-TO-CLOCK-PIN ASSIGNMENTS FOR CIRCUIT DESIGN
- 204 ACCESS CONNECTIVITY DATA FOR CIRCUIT DESIGN
- 206 ACCESS COMMON PATH PESSIMISM REMOVAL (CPPR) DATA FOR CIRCUIT DESIGN
- 208 GENERATE SET OF SCORES FOR INITIAL SET OF CLOCK-TAP-TO-CLOCK-PIN ASSIGNMENTS
- 210 GENERATE MODIFIED SET OF CLOCK-TAP-TO-CLOCK-PIN ASSIGNMENTS BASED ON SET OF SCORES AND INITIAL SET OF CLOCK-TAP-TO-CLOCK-PIN ASSIGNMENTS
- 212 GENERATE CLOCK TREE FOR CIRCUIT DESIGN BASED ON MODIFIED SET OF CLOCK TAP ASSIGNMENTS

FIG. 2

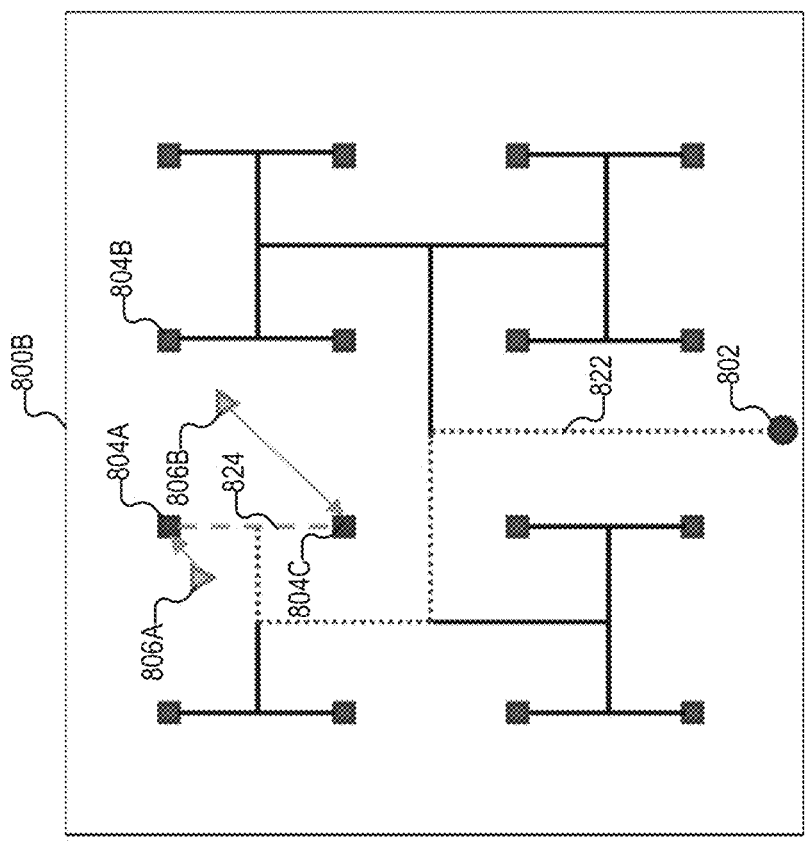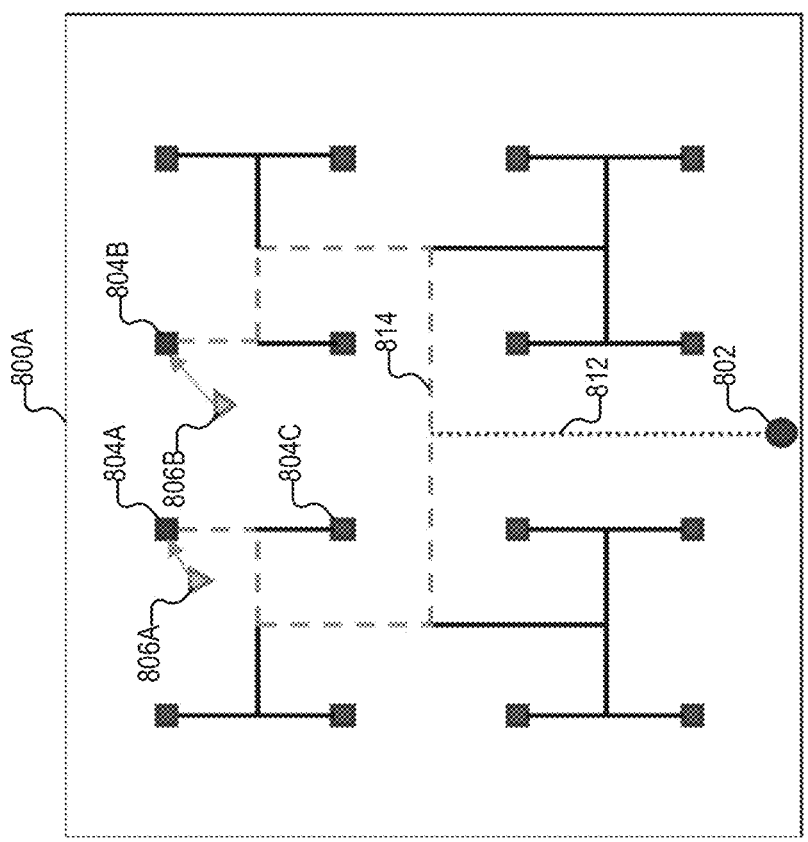
FIG. 8

US 10,860,775 B1

CLOCK PIN TO CLOCK TAP ASSIGNMENT BASED ON CIRCUIT DEVICE CONNECTIVITY

TECHNICAL FIELD

Embodiments described herein relate to circuit design and, more particularly, to systems, methods, devices, and instructions for assigning a clock pin to a clock tap within a circuit design, which may be part of electronic design automation (EDA).

BACKGROUND

As a part of designing a circuit, such as an integrated circuit (IC) circuit, an electronic design automation (EDA) software system commonly performs generation of a clock network, which uses a branching network to distribute a clock signal from a clock signal source to a plurality of clock sinks within a circuit design. The clock sinks usually comprise circuit devices in the circuit design that are designed to be clocked and thus need a clock signal to operate. Examples of clock sinks include, without limitations, flip-flops or other sequential circuit devices that rely on a clock signal to synchronize their operations. A clock sink can receive a clock signal via a clock pin included by the clock sink.

Typically, generation of a clock network comprises two phases: (1) generation of a top level of the clock network; and (2) generation of a bottom level of the clock network (also referred to as a subordinate clock tree). The top level can comprise a clock network that delivers a clock signal to a set of clock tapping point nodes (hereafter, clock taps) distributed across a floorplan of a circuit design. Though a top-level clock network can be highly regular, delays among different clock taps can still be different due to, for example, different loading of clock taps, process variation, temperature variation, and other factors. Before the bottom level is generated, a set of clock pins (clock pins of each clocked device) is usually assigned to the set of clock taps. This is often referred to as clock-tap-to-clock-pin assignment, or simply clock tap assignment. The bottom level comprises a set of clock trees (generated during clock tree synthesis (CTS)) between each clock tap and their assigned clock pins, thereby delivering the clock signal from the set of clock taps to the set of clock pins.

Generally, a generated clock network comprises a branching network of fan-out buffers or fan-out inverters to distribute a clock signal from a root clock signal source to a set of clock pins within the circuit design. Within a clock network, the number and arrangement of buffers or inverters to fan-out and deliver a clock signal to clock pins can depend on, for example, the number of clock pins that need to receive the clock signal, electrical requirements, and managing delay within the clock network. Additionally, nodes of a clock network can comprise a logical or control function in the path from a clock source to a control pin, such as a clock-gate or integrated clock gate (ICG), which can be used to turn off the pin and logic paths they contribute to. Under designed, specific conditions, a final circuit resulting from a given circuit design can use an ICG to turn off a cluster of clock pins (also referred to as a ICG group) if the cluster is not required for certain operations of the final circuit for the active operation of the IC. In this way, the ICG can permit the final circuit to save power that would otherwise be consumed by the cluster had it not been gated from the clock tap by the ICG. However, ICGs themselves are power- and area-expensive, and if too many copies of logically equivalent ICGs are made, this can negatively impact power.

In order to maintain a circuit design's logical correctness, each clock pin should receive the clock signal at approximately the same time. Tolerance for clock pins receiving a clock signal at different times can depend on the circuit design's operating frequency. The assignment of clock taps to clock pins can directly affect the timing and operation of a circuit design. Generally, clock networks are designed such that the delay from the source node to a plurality of clock taps is closely matched. Accordingly, each clock network path from the clock source node to the clock tap-point is logically equivalent such that any clock tap can be logically used to connect to the remaining clock circuit to a specific clock pin. The choice of clock tap to clock pin assignment can impact performance of a circuit device of a circuit design and thus the performance of the circuit design.

A conventional clock tap assignment process is often based on geometric distance, where each clock pin is assigned to a nearest clock tap using a "nearest neighbor" approach, which can optimize the performance of the subordinate clock tree. Additionally, a conventional clock tap assignment may consider clock taps that are further away to reduce ICG count while maintaining reasonable clock-tap-to-clock-pin path length and clock tap fanout.

BRIEF DESCRIPTION OF THE DRAWINGS

Various ones of the appended drawings merely illustrate various embodiments of the present disclosure and should not be considered as limiting its scope.

FIGS. 2 through 4 are flowcharts illustrating example methods for assigning a clock tap to a clock pin based on connectivity between circuit devices of a circuit design, according to some embodiments.

FIGS. 6 through 8 are diagrams illustrating example clock networks that can be processed by various embodiments described herein.

DETAILED DESCRIPTION

Figure 1:
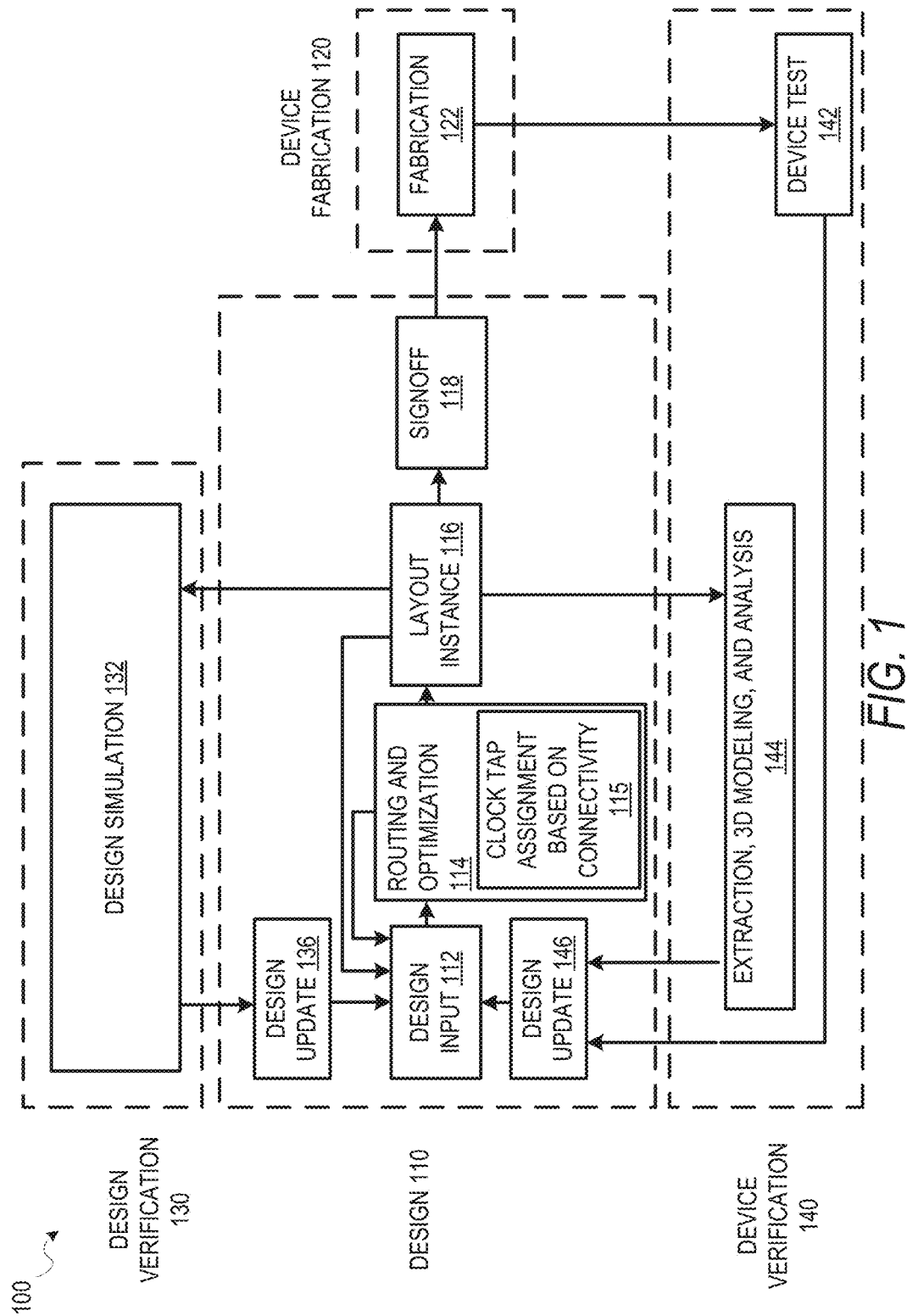
FIG. 1 is a diagram illustrating an example design process flow for assigning a clock tap to a clock pin based on connectivity between circuit devices of a circuit design, according to some embodiments.

Clock tree design is a major step in circuit (e.g., integrated circuit) physical design, as it can significantly affect the performance and power consumption of the circuit design. In circuit designs including multiple clock sources, the act of assigning a clock pin of a circuit device (e.g., flip-flop) to a clock tap of a particular clock source can influence a clock tree's power use and timing of circuit paths controlled by clock sources. Usually, conventional methods for assigning clock pins to clock taps are performed before clock tree synthesis (CTS) and take into account, for example, balancing the number of clock pins assigned to each clock tap, minimizing ICG cloning (where extra ICGs are used to control clock pins that are from a single ICG group but are assigned to different clock taps), and minimizing distance between clock taps and clock pins as a proxy for timing performance. However, conventional methods for assigning clock taps to clock pins do not take into account certain timing-related factors between circuit devices of a circuit design, which can improve clock tap to clock pin assignments for a clock network over the conventional methods.

Various embodiments described herein assign, within a circuit design, a clock tap to a clock pin of a circuit device (e.g., flip-flop) to improve timing of a path between the clock tap and the clock pin, which in turn can improve data path timing within a circuit design. By improving timing of a path between a clock tap and a clock pin of a circuit device, some embodiments increase the maximum frequency of the path in a final circuit between that circuit device (e.g., flip-flop) and another circuit device (e.g., another flip-flop) resulting from the circuit design, which in turn can improve the maximum frequency of the overall final circuit. Additionally, improving the timing of the path as described herein, some embodiments can assist in reducing buffering, wirelength, or both, which in turn can assist in reducing overall power consumption within the circuit design.

In particular, various embodiments consider assignment of a clock tap to a clock pin of a circuit device of a circuit design based on connectivity between circuit devices of the circuit design. For instance, various embodiments described herein can assign a single clock tap to clock pins of two or more different circuit devices that are connected together (e.g., a plurality of flip-flops connected in series) and that share timing criticality. As used herein, circuit devices of a circuit design that are connected together can comprise circuit devices that share a common data path.

Various embodiments described herein can assign a single clock tap to clock pins of two or more connected circuit devices based on connectivity information regarding those two or more connected circuit devices, such as data path slack (hereafter, referred to as slack) between those two or more connected circuit devices. For example, some embodiments can assign a single clock tap to clock pins of two or more different circuit devices that share a common data path edge having a critical timing issue, as determined based a timing analysis of a circuit design. A critical timing issue can include, for example, a negative slack for the shared data path edge that results in a slack violation for the circuit design.

Additionally, various embodiments can assign clock taps to clock pins based on data that provides timing variation information for a circuit design, such as common path pessimism removal (CPPR) information associated with two connected circuit devices of the circuit design. Delays between a clock source and different clock taps within a clock network can be different, the fluctuation/variation in delays between two different clock taps can be different, and that fluctuation/variation can be measured by a physical common path (in the clock network) shared by the clock tap pair. Generally, the longer the clock-source-to-clock-tap common path, the less the delay variation. As used herein, CPPR information for a circuit design can help a timing analysis process (performed on a circuit design) account for final timing variation of the circuit design based on the common path of the clock network. For example, timing analysis of a circuit design can use CPPR information in removing timing penalties from clock path analysis for common portions of a clock network. As used herein, CPPR data can comprise the CPPR information for a circuit design. Depending on the embodiment, the CPPR data can comprise a look-up table or database (e.g., one generated as part of CTS) that stores the CPPR information. For some embodiments, the CPPR information is associated with the top level of the clock network.

For some embodiments, a clock-tap-to-clock-pin assignment is generated based on at least one of slack data or time variation data (e.g., CPPR data), and further based on one or more of load balancing, routing wire length, and ICG cloning.

According to some embodiments, an initial (clock tap) assignment, between a clock tap of a circuit design and a clock pin of the circuit design, is accessed as input, and a modified (clock tap) assignment, between the clock tap and another clock pin of the circuit design, can be generated based on one or more of the following considerations: a clock tap assignment should try to assign clock pins of connected circuit devices (those having a common data path) to the same clock tap; a clock tap assignment should try to assign clock pins of connected circuit devices having the critical timing issues (e.g., negative slack); a clock tap assignment should try to assign clock pins of connected circuit devices to clock taps (e.g., two different clock taps) with longer common path length (based on common path pessimism removal (CPPR) information). Depending on the embodiment, one or more of these considerations can be combined with one or more other considerations, such as clock tap driving distance, load balancing of a clock tap assignment, and avoiding ICG cloning. For some embodiments, the initial clock tap assignment is determined by a conventional method of clock tap assignment.

For some embodiments, the modified assignment is generated based on the initial assignment and a score determined by the following scoring function (hereafter, referred to a Function 1):

$$\text{Score}(i \to t_x) = \sum_{e_{i,j}}^{E_i} \min(\text{slack}_{i,j} + CPPR_{t_j,t_x}, 0)$$

where:
Score($i \to t_x$) score of assigning clock pin i to clock tap $t_x$;
slack$_{i,j}$: slack of data path between the circuit device having clock pin i to the circuit device having clock pin j;
CPPR$_{t_j,t_x}$: CPPR for the clock tap pair of clock tap $t_x$ and clock tap $t_j$, where clock tap $t_j$ is the current clock tap assigned to clock pin j (according to the initial assignment discussed above);
$E_i$: all edges in the timing graph connecting circuit device associated with clock pin i; and
$e_{i,j}$: the edge connecting circuit device having clock pin i and circuit device having clock pin j in the timing graph.

As described herein, connectivity data can describe connectivity of circuit devices of a circuit design. For some embodiments, the connectivity data describes connectivity of circuit designs as a timing graph that comprises a plurality of edges E. Additionally, for some embodiments, the connectivity data describes slack information between two circuit devices that are connected by an edge in the timing graph. For various embodiments, connectivity data is generated as part of performing timing analysis on the circuit design based on an initial set of clock-tap-to-clock-pin assignments, as described herein. Parameters for the Function 1 can be provided by connectivity data associated with a circuit design. More regarding example use of Function 1 is described herein with respect to FIG. 4.

As used herein, a clock tap assignment refers to an assignment between a clock tap and a clock pin.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for assigning a clock tap to a clock pin based on connectivity between circuit devices of a circuit design, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. Though not shown, the routing and optimization 114 operation can include a clock tree synthesis (CTS) operation, which can generate one or more clock trees that deliver clock signals from clock sources of a circuit design to a plurality of clock tree leaf nodes comprising clock tree pins (e.g., of circuit devices, such as flip-flops) within the circuit design. The routing and optimization 114 operation may also include other operations not shown, such as those relating to floorplanning, placement, post-placement optimization, and post-routing optimization. As shown, the routing and optimization 114 operation includes a clock tap (to clock pin) assignment based on connectivity 115 operation, which may be performed in accordance with various embodiments described herein. Operation 115 may be performed after generating a top level of a clock network, and may be performed prior to a CTS operation.

While the design process flow 100 shows optimization occurring prior to a layout instance 116, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

Design inputs are used in the design input 112 operation to generate an initial circuit layout. The design inputs may be further processed during the design input 112 operation via a process, such as logic-synthesis, to generate a circuit netlist mapped to a target standard library manufacturable by the foundry in fabrication 122 operation. After design inputs are used in the design input 112 operation to generate an initial circuit layout, and any of the routing and optimization 114 operations are performed, a resulting layout is generated as the layout instance 116. The netlist as placed by the layout instance 116 describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 3:
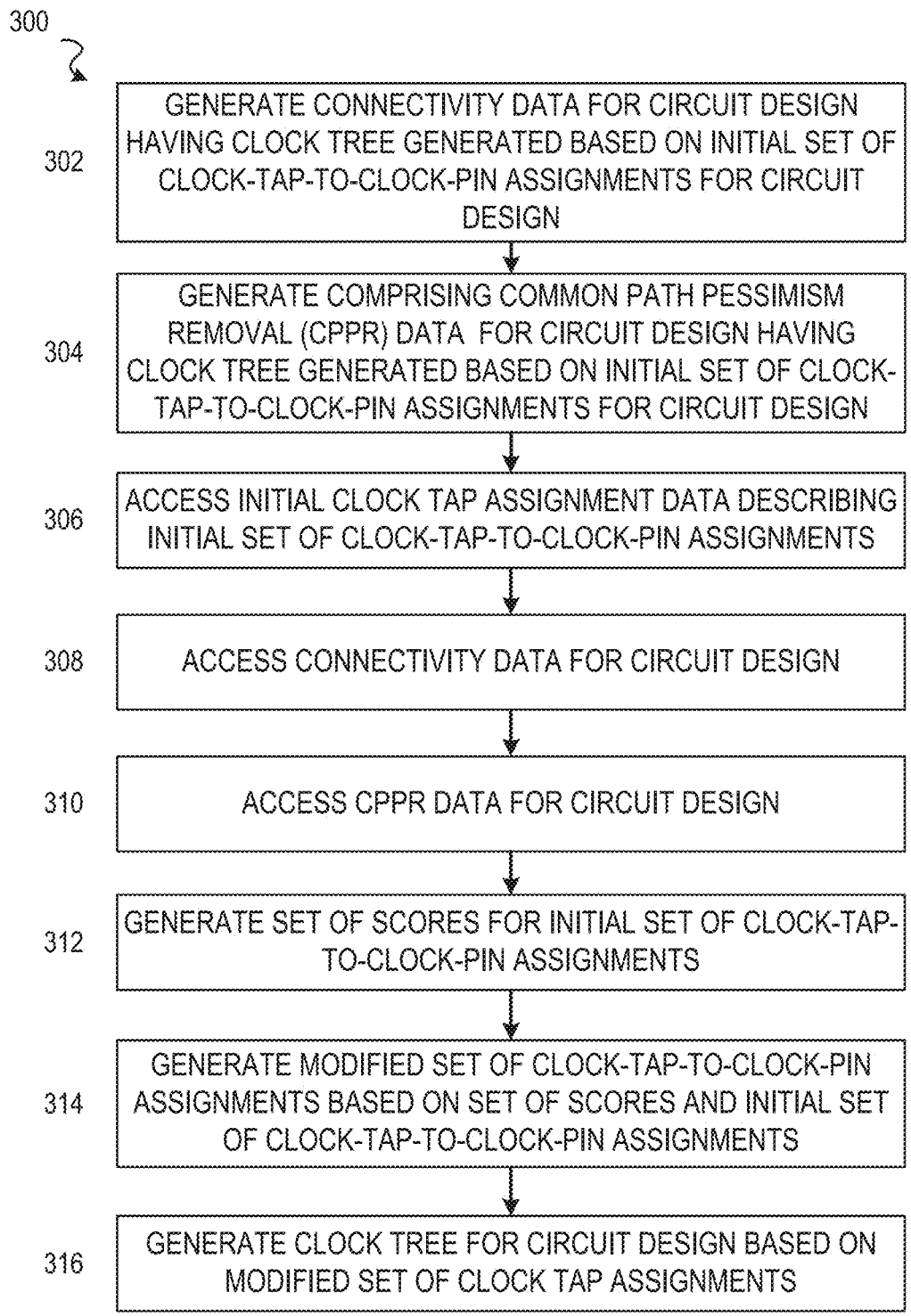
Figure 4:
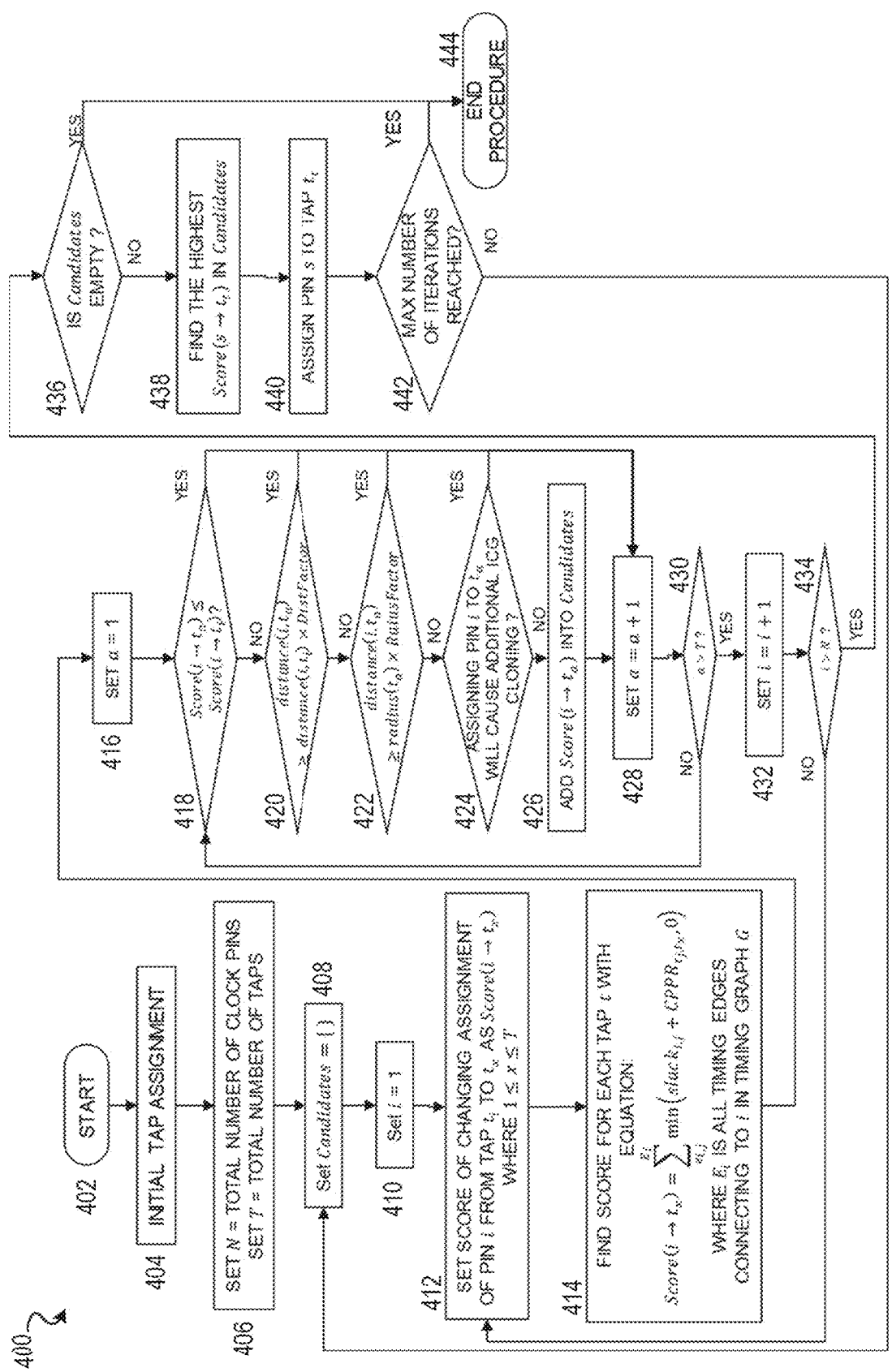

FIGS. 2 through 4 are flowcharts illustrating example methods for assigning a clock tap to a clock pin based on connectivity between circuit devices of a circuit design, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

Referring now to FIG. 2, the flowchart illustrates the example method 200 for assigning a clock tap to a clock pin based on connectivity between circuit devices of a circuit design, according to some embodiments. For some embodiments, the method 200 is performed as part of a CTS process with respect to a circuit design (e.g., by an EDA software system). An operation of the method 200 (or another method described herein) may be performed by a hardware processor (e.g., central processing unit or graphics processing unit) of a computing device (e.g., desktop, server, etc.).

The method 200 as illustrated begins with operation 202 accessing initial clock tap assignment data that describes an initial set of assignments between a set of clock taps of a circuit design and a set of clock pins of a circuit design. As described herein, the initial clock tap assignment data can be generated by an initial clock tap assignment process, which may be performed in accordance with known methodologies for assigning clock taps to clock pins.

The method 200 continues with operation 204 accessing connectivity data that describes a set of data path connections between a plurality of circuit devices of the circuit design associated with the set of clock pins. For some embodiments, the connectivity data further describes timing information between two connected circuit devices. For instance, the connectivity data can comprise slack information for the set of data path connections between the plurality of circuit devices. An example of this is illustrated with respect to example clock network 700 of FIG. 7. At least some of the information stored by the connectivity data can be represented as a timing graph for the plurality of circuit devices. In the timing graph, each circuit device can be represented by a node, each data path connection between two circuit devices can be represented by an edge between the respective nodes, and timing information associated with a data path connection can be associated with the respective edge.

Figure 5A:
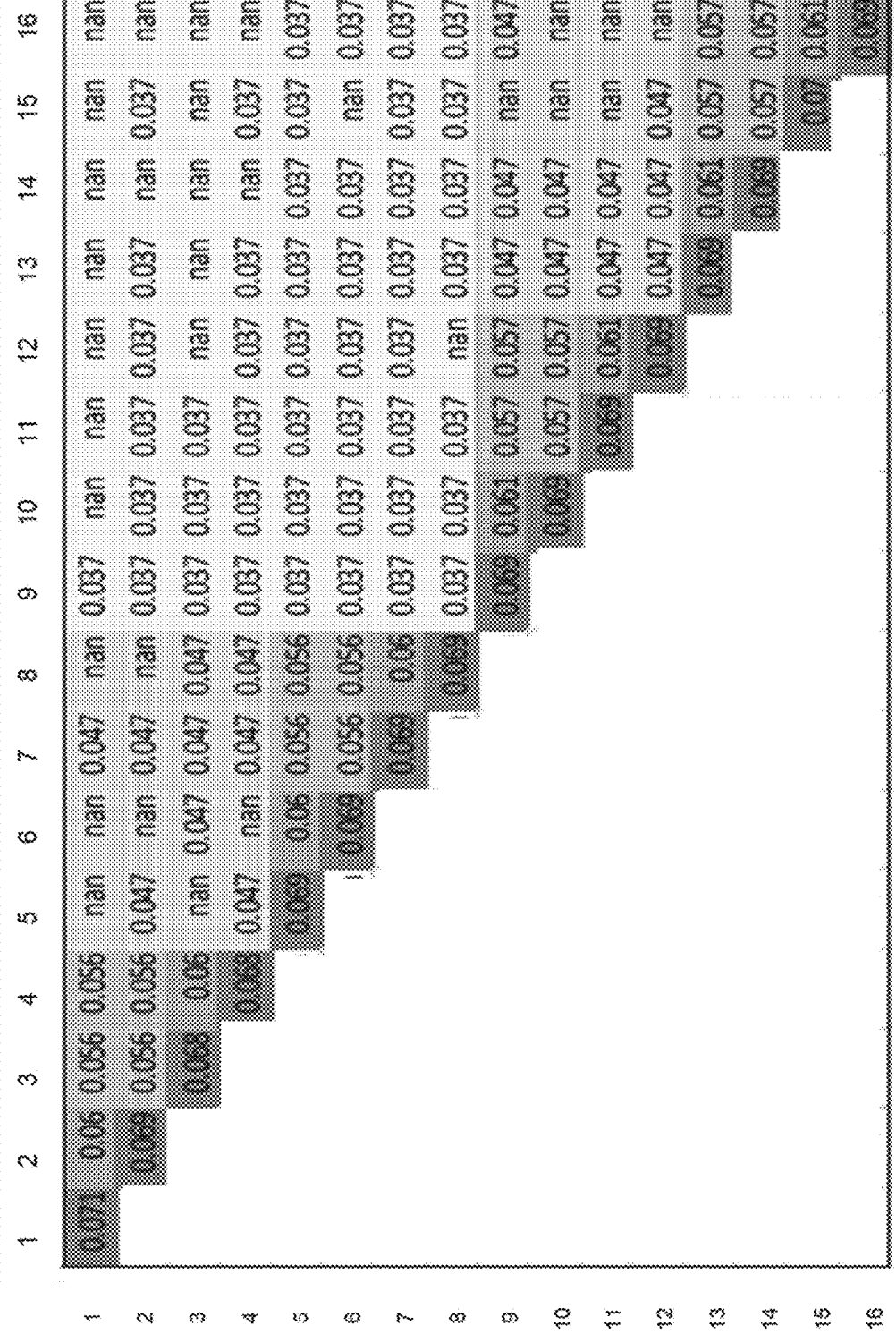
FIG. 5A is a table comprising example generating common path pessimism removal (CPPR)information for clock tap pairs of an example top level clock network illustrated by FIG. 5B.

The method 200 continues with operation 206 accessing common path pessimism removal (CPPR) data that comprises common path pessimism removal information for the circuit design. The CPPR data can comprise a look-up table or database that provides CPPR information (e.g., timing penalties) for pairs of clock taps. An example of such a table is illustrated in FIG. 5A. As described herein, CPPR information can be used in removing timing penalties from clock path analysis for common portions of a clock network, which can be used in identifying longer common path lengths when assigning clock pins of connected devices to clock taps (e.g., two different clock taps).

The method 200 continues with operation 208 generating a set of scores for the initial set of assignments by scoring each given assignment, in the initial set of assignments, based on the connectivity data accessed at operation 204, based on the common path pessimism removal (CPPR) data accessed at operation 206, or a combination of both. For instance, where a given assignment assigns a first tap to a first pin and the first pin is associated with a first circuit device of the circuit design, some embodiments can score the given assignment based on the connectivity data by generating a score for the given assignment based on slack information for each data path connection between the first circuit device and another circuit device of the circuit design. Each data path connection can be represented as an edge in a timing graph described by the connectivity data, and the slack information for the data path connection is associated with the edge. In another instance, where a given assignment assigns a first tap to a first pin and the first pin is associated with a first circuit device of the circuit design, some embodiments can score the given assignment based on the CPPR data by generating a score for the given assignment based on common path pessimism removal (CPPR) information associated with the first tap and each other tap (in the set of clock taps) that is assigned to another circuit device of the circuit design that is connected with the first circuit device.

For some embodiments, the score for the given assignment is generated based on some combination of both slack information and CPPR information. For example, the given score can be generated based on a scoring function similar to Function 1 described herein, which can consider slack information (provided by the connectivity data) and CPPR information (provided by the CPPR data). Connectivity information enables various embodiments to assign clock pins of connected circuit devices having a critical timing issue (e.g., negative slack) to a same (single) clock tap. CPPR information enables various embodiments to assign clock pins of connected circuit devices to clock taps having longer common path length within a top level of a clock network.

The method 200 continues with operation 210 generating a modified set of assignments between the set of clock taps and the set of clock pins based on the initial set of assignments and the set of scores. The modified set of assignments comprises at least one clock tap assignment that replaces an existing clock tap assignment in the initial set of assignments. For some embodiments, an initial clock tap assignment (in the initial set of assignments) can be replaced by a modified clock tap assignment (in the modified set of assignments) based on a comparison of the score of the initial clock tap assignment to the score of the modified clock tap assignment. For example, for some embodiments, if the score of the modified clock tap assignment is greater than the score of the initial clock tap assignment, the modified clock tap assignment could be considered a replacement of the initial clock tap assignment. For some embodiments, a score generated by operation 208 represents one of plurality of factors (e.g., geometric distance, radius distance, ICG cloning, etc.) that can be considered when replacing an initial clock tap assignment with a modified clock tap assignment.

The method 200 continues with operation 212 generating a clock tree for the circuit design based on the modified set of assignments generated at operation 210. During operation 212, a wire can be routed between each clock tap and clock pin based on the modified set of assignments, thereby forming the bottom level of the clock network. According to some embodiments, operation 212 is performed as part of a clock tree synthesis (CTS) process performed on the circuit design (e.g., by an EDA software system). In comparison to the clock tree generated for the circuit design based on the initial set of assignments, the clock tree generated by operation 212 can represent a new clock tree (for the circuit design) that is generated based on at least one of connectivity data and CPPR data.

Referring now to FIG. 3, the flowchart illustrates the example method 300 for assigning a clock tap to a clock pin based on connectivity between circuit devices of a circuit design, according to some embodiments. Like the method 200 of FIG. 2, the method 300 may be performed as part of a CTS process with respect to a circuit design (e.g., by an EDA software system). An operation of the method 300 may be performed by a hardware processor.

The method 300 as illustrated begins with operation 302 generating at least a portion of connectivity data by performing a timing analysis on a circuit design having a clock tree that is generated based on an initial set of assignments.

The method 300 as illustrated continues with operations 304 generating common path pessimism removal (CPPR) information based on a circuit design having a clock tree that is generated based on an initial set of assignments.

The method 300 continues with operations 306 through 316, which according to some embodiments are respectively similar to operations 202 through 212 described above with respect to the method 200 of FIG. 2.

Referring now to FIG. 4, the flowchart illustrates the example method 400 for assigning a clock tap to a clock pin based on connectivity between circuit devices of a circuit design, using the scoring Function 1 described herein, according to some embodiments. Like the method 200 of FIG. 2, the method 400 may be performed as part of a CTS process with respect to a circuit design (e.g., by an EDA software system). An operation of the method 400 may be performed by a hardware processor.

The method 400 as illustrated starts at operation 402 and ends at operation 444. From operation 402, the method 400 continues with operation 404 performing an initial tap assignment for generating an initial set of assignments between clock taps and clock pins of a circuit design, as described herein. For some embodiments, this initial set of assignments is generated using a conventional method of clock-tap-to-clock-pin assignment process.

The method 400 continues with operations 406-410, which initialize the method 400. At operation 406, N is set to the total number of clock pins associated with circuit devices of the circuit design, and T is set to the total number of clock taps within the circuit design. At operation 408, an empty Candidate set initialized, which will be used by later operations of the method 400. At operation 410, the variable i is initialized to a value of 1.

The method 400 continues with operation 412 setting the score for changing an assignment of clock pin i from clock tap $t_i$ to clock tap $t_x$ to Score(i→$t_x$), where the assignment of clock pin i to clock tap $t_i$ is based on the initial set of assignments generated by operation 404.

The method 400 continues with operation 414 finding a score for changing clock pin i from clock tap $t_i$ (assigned based on the initial set of assignments generated by operation 404) to each other clock tap t of the circuit design using Function 1 (as described herein). In particular, the method 400 continues with operation 416 setting a variable a to a value of 1. The method 400 continues with operation 418 determining whether Score(i→$t_a$)≤Score(i→$t_i$). If yes, the method 400 continues with operation 428 incrementing variable a by a value of 1, otherwise the method 400 continues to operation 420.

Operation 420 determines whether distance(i, $t_a$)≥distance(i, $t_i$)×DistFactor, where distance(x,y) represents a geometric distance between node x and node y, and DistFactor comprises an adjustable value (e.g., value that is greater than or equal to 1) that can control the limit of geometric distance increase between the pin i and the assigned tap. If yes, the method 400 continues with operation 428 incrementing variable a by a value of 1, otherwise the method 400 continues to operation 422. This basically means that the resulting pin-tap distance is greater than the original pin-tap distance times DistFactor and, as a result, the tap assignment (i→$t_a$) will not be considered.

Operation 422 determines whether distance(i, $t_a$)≥radius($t_a$)×RadiusFactor, where distance(x, y) represents a geometric distance between node x and node y, where radius($t_a$) represents a maximum geometric distance between tap $t_a$ and a pin which is assigned to tap $t_a$, and where RadiusFactor comprises an adjustable value (e.g., value greater than or equal to 1) that can control the limit of tap radius increase caused by a pin assignment. If yes, the method 400 continues with operation 428 incrementing variable a by a value of 1, otherwise the method 400 continues to operation 424. This mean that the resulting radius of tap $t_a$ is greater than the original radius of tap $t_a$ times RadiusFactor and, as a result, the tap assignment (i→$t_a$) will not be considered.

Operation 424 determines whether assigning the clock pin i to clock tap $t_a$ will cause additional ICG cloning within the circuit design. If yes, the method 400 continues with operation 428 incrementing variable a by a value of 1, otherwise the method 400 continues to operation 426.

In operation 426, Score(i→$t_a$) is added to the Candidate set that was initialized at operation 408. The method 400 then continues to operation 428 incrementing variable a by a value of 1.

From operation 428, the method 400 continues with operation 430 determining whether a>T, where T was set by operation 406 to the total number of clock taps of the circuit design. If yes, the method 400 continues with operation 432 incrementing variable i by a value of 1, otherwise the method 400 returns to operation 418.

From operation 432, the method 400 continues with operation 434 determining whether i>N, where N was set by operation 406 to the total number of clock pins of the circuit design. If yes, the method 400 continues to operation 436, otherwise the method 400 returns to operation 412.

Operation 436 determines whether the Candidate set is empty. If yes, the method 400 ends at operation 444, otherwise the method 400 continues with operation 438 finding the highest Score(i→$t_r$) in the Candidate set.

From operation 438, the method 400 continues with operation 440 assigning a clock pin s to clock tap tr. For some embodiments, assigning a clock pin s to clock tap $t_r$ results in a modified assignment between a clock pin and clock tap in comparison to the initial assignments determined by operation 404.

The method 400 continues with operation 442 determining whether a max number of iterations have been reached, which may be parameter-determined (e.g., by a user or an EDA system setting) prior to the method 400 commencing. If yes, the method 400 ends at operation 444, otherwise the method 400 returns to operation 408.

Figure 5B:
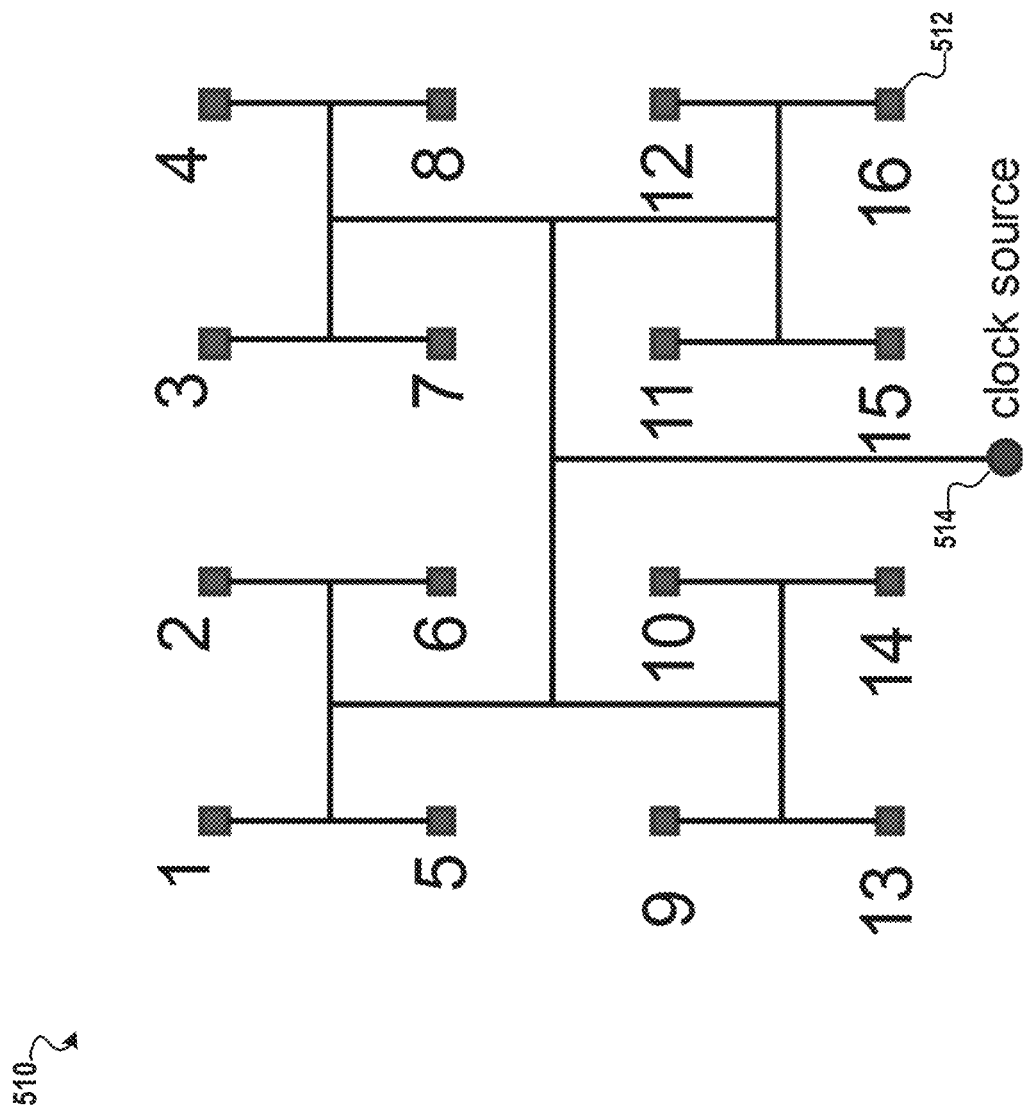

FIG. 5A is a table 500 comprising example CPPR information for clock tap pairs of an example top level clock network 510 illustrated by FIG. 5B. Referring to FIG. 5B, the top level clock network 510 is shown to comprise a plurality of clock taps 1 through 16 (e.g., clock tap 16 is referenced by 512), each which is coupled to a clock source 514.

Referring now to FIG. 5A, the table 500 comprises numerical values representing the amount of time variation that will be over-estimated when two clock taps (two of clock taps 1-16 of the top level clock network 510) are used for two clock network paths in a clock network of a circuit design. The values in the table 500 represent example CPPR information that can be used in assigning a clock tap a clock pin based on connectivity of circuit devices of a circuit design, according to some embodiments. The table 500 can be implemented as a look-up table or a database that an embodiment described herein can use in assigning a clock tap to a clock pin.

Figure 6:
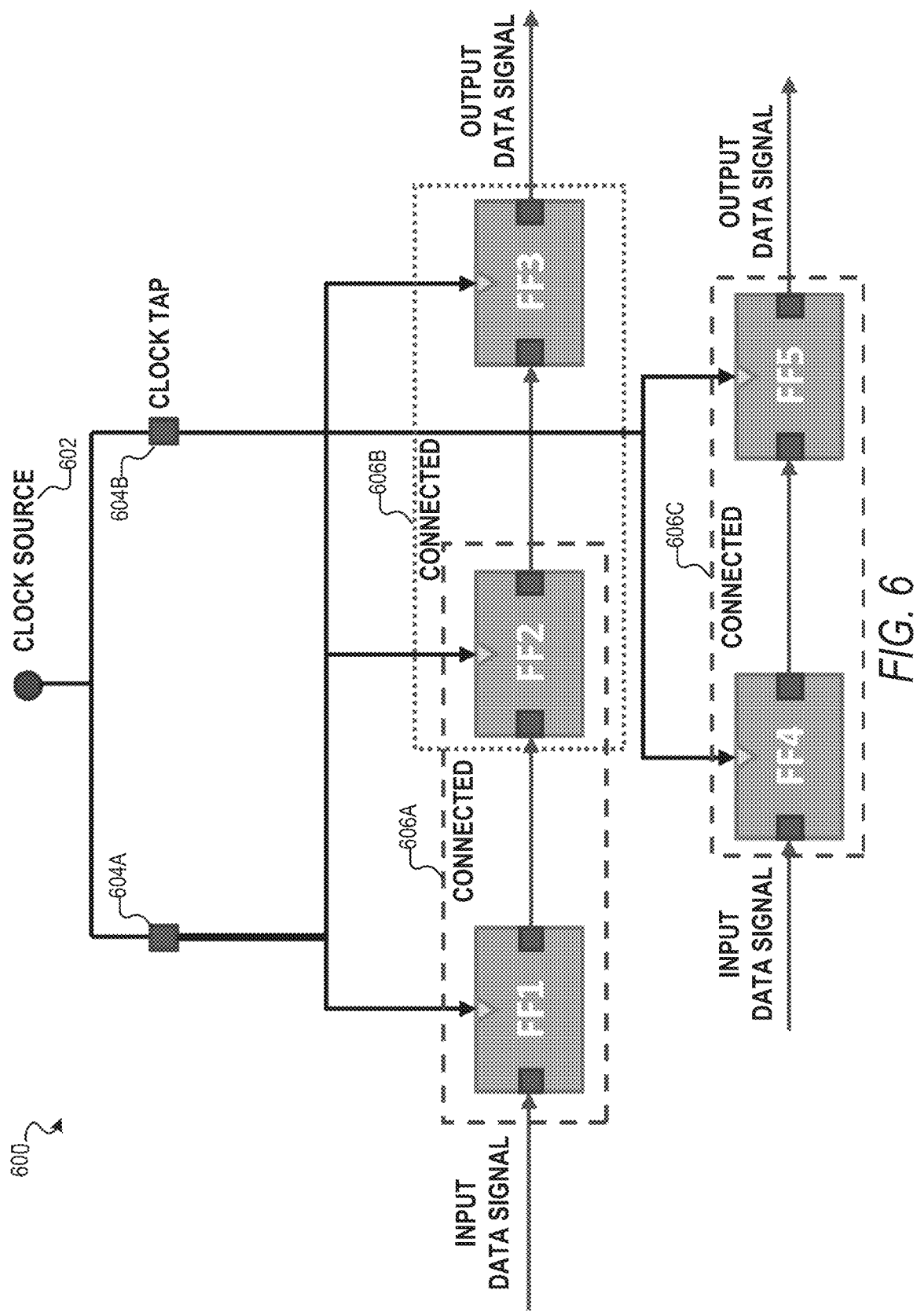

FIG. 6 is a diagram illustrating an example clock network 600 that can be processed by various embodiments described herein. As illustrated, the clock network 600 comprises a clock source 602, clocks taps 604A, 604B, and flipflops FF1, FF2, FF3, FF4, FF5, which represent circuit devices of a circuit design. The clock pin of each of flipflops FF1, FF2 is coupled to the clock tap 604A, and the clock pin of each of flipflops FF3, FF4, FF5 is coupled to the clock tap 604B. Flipflops FF1 and FF2 represent a pair of connected circuit devices 606A, flipflops FF2 and FF3 represent a pair of connected circuit devices 606B, and flipflops FF4 and FF5 represent a pair of connected circuit devices 606C. As shown, each of the pairs of connected circuit devices 606A, 606B, 606C are connected by a common data path. Additionally, each of the pairs of connected circuit devices 606A, 606B, 606C represents a pair of circuit devices that some embodiments described herein attempt to connect to the same clock tap.

Figure 7:
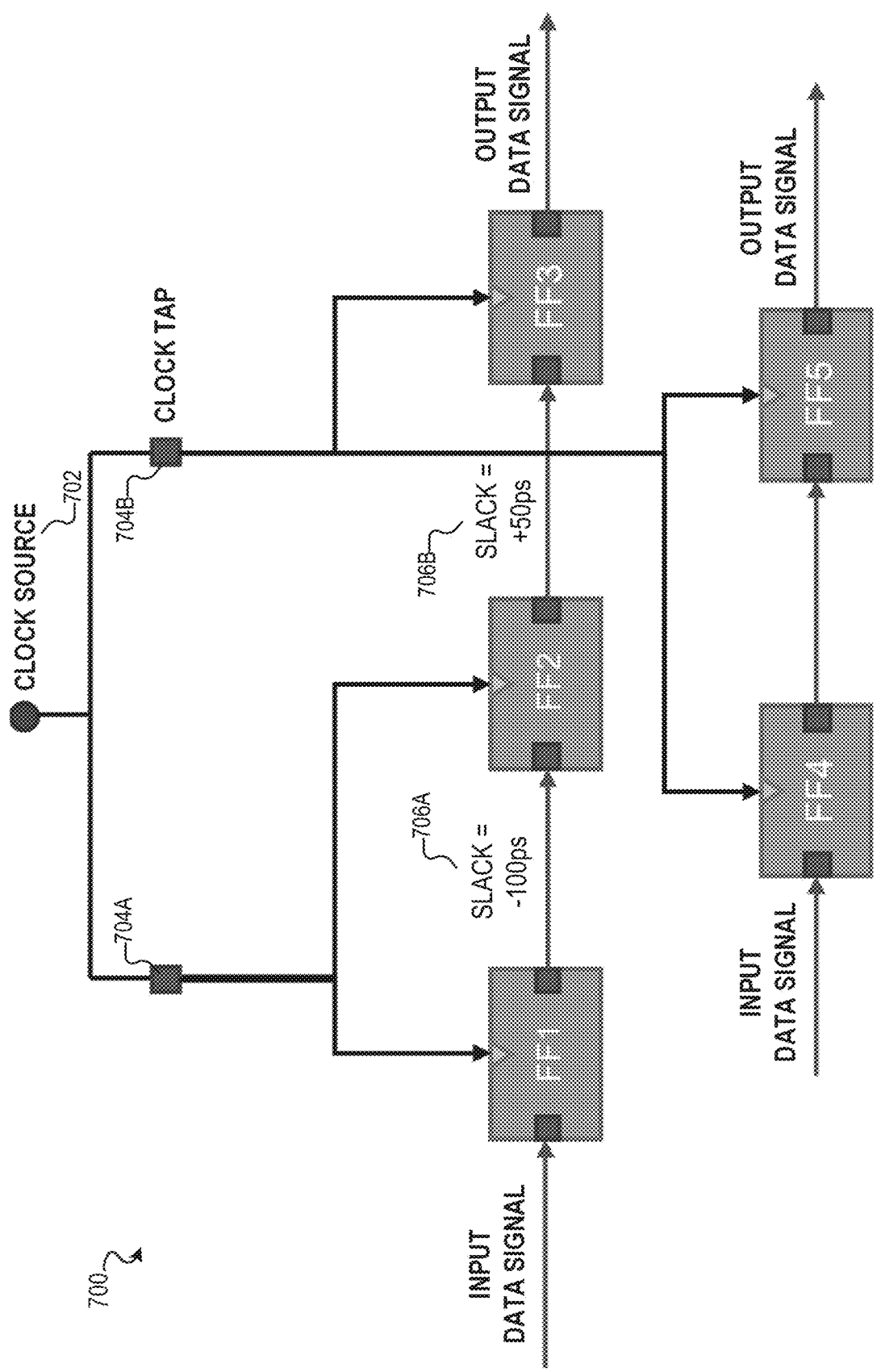

FIG. 7 is a diagram illustrating an example clock network 700 that can be processed by various embodiments described herein. As illustrated, the clock network 700 comprises a clock source 702, clocks taps 704A, 704B, and flipflops FF1, FF2, FF3, FF4, FF5, which represent circuit devices of a circuit design. The clock pin of each of flipflops FF1, FF2 is coupled to the clock tap 704A, and the clock pin of each of flipflops FF3, FF4, FF5 is coupled to the clock tap 704B. As shown, there is slack 706A between flipflops FF1 and FF2 is −100 ps, and there is slack 706B between flipflops FF1 and FF2 is +50 ps. For some embodiments, each of the slacks 706A, 706B is described by connectivity data described herein, which may describe a time graph for the circuit design. Some embodiments described herein attempt to connect flipflops FF1, FF2 to a common clock tap based on slack 706A being negative, which can indicate a time criticality issue.

FIG. 8 is a diagram illustrating an example clock network 800 that can be processed by various embodiments described herein. In FIG. 8, clock network 800A illustrates the clock network 800 with a clock pin 806A assigned to a clock tap 804A and a clock pin 806B assigned to a clock tap 804B, where the clock taps 804A and 804B share a common path 812, and 814 represents the divergent path coupling the common path 812 to the clock taps 804A and 804B. In contrast, clock network 800B illustrates the clock network 800 with the clock pin 806A assigned to the clock tap 804A and the clock pin 806B assigned to a clock tap 804C, where the clock taps 804A and 804C share a common path 822, and 824 represents the divergent path coupling the common path 822 to the clock taps 804A and 804B. As shown, clock tap assignment illustrated by the clock network 800B results in a longer common path (and thus less delay variation described by the CPPR information for the clock network 800) than the common path resulting from the clock tap assignment illustrated by the clock network 800A. Based on CPPR information for the clock network 800, some embodiments described herein attempt to assign the clock pins 806A, 806B according to the clock assignments illustrated by the clock network 800B.

Figure 9:
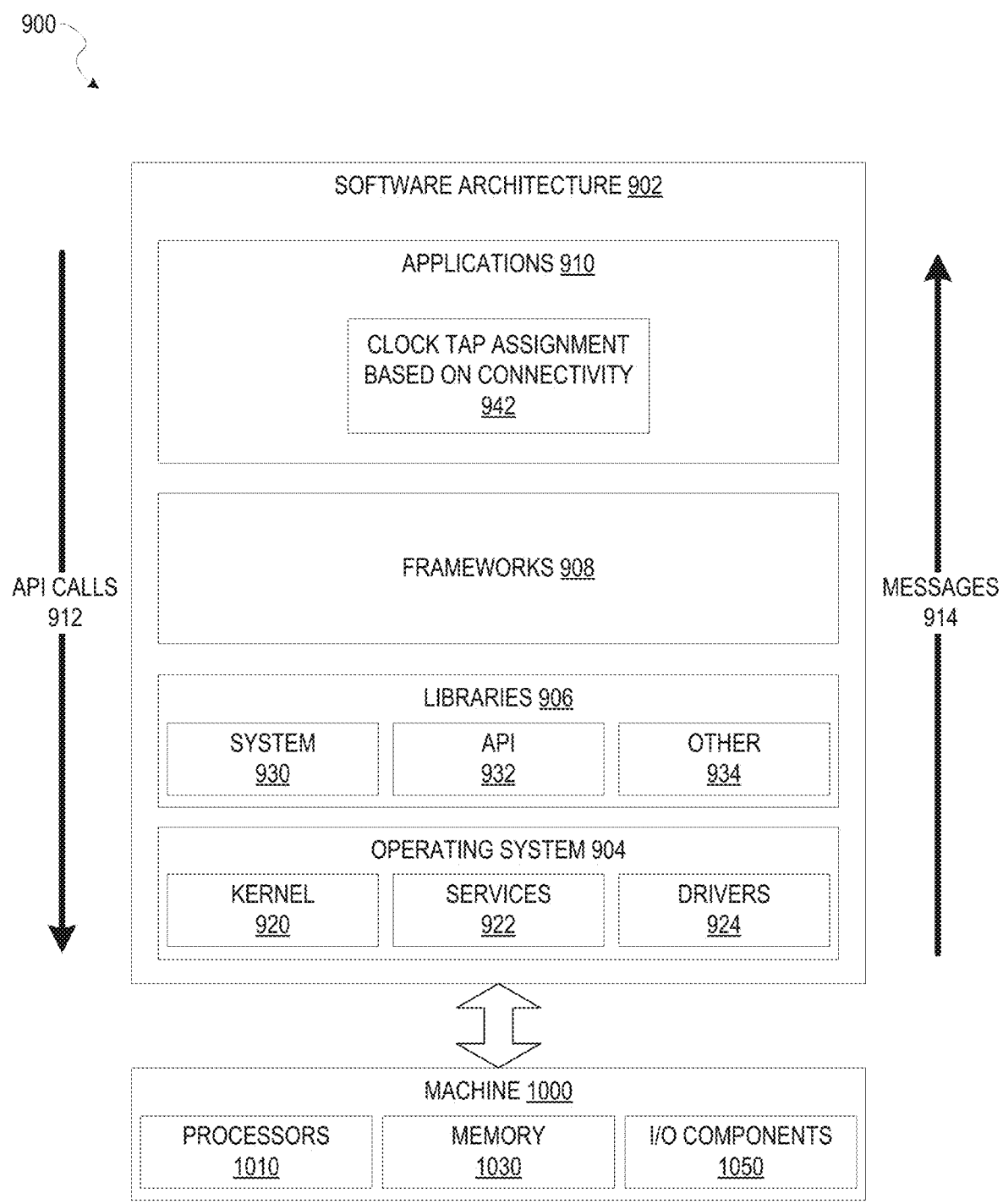
FIG. 9 is a block diagram illustrating an example of a software architecture that may be operating on an electronic design automation (EDA) computing device and may be used with methods for clock-tap-to-clock-pin assignment based on connectivity, according to some embodiments.

FIG. 9 is a block diagram 900 illustrating an example of a software architecture 902 that may be operating on an EDA computer and may be used with methods for assigning clock taps to clock pins based on connectivity between circuit devices of a circuit design, according to some embodiments. The software architecture 902 can be used as an EDA computing device to implement any of the methods described above. Aspects of the software architecture 902 may, in various embodiments, be used to store circuit designs, and to facilitate generation of a circuit design in an EDA environment by assigning clock taps to clock pins based on connectivity between circuit devices of the circuit design, from which physical devices may be generated.

FIG. 9 is merely a non-limiting example of a software architecture 902, and it will be appreciated that many other architectures can be implemented to facilitate the functionality described herein. In various embodiments, the software architecture 902 is implemented by hardware such as a machine 1000 of FIG. 10 that includes processors 1010, memory 1030, and I/O components 1050. In this example, the software architecture 902 can be conceptualized as a stack of layers where each layer may provide a particular functionality. For example, the software architecture 902 includes layers such as an operating system 904, libraries 906, software frameworks 908, and applications 910. Operationally, the applications 910 invoke application programming interface (API) calls 912 through the software stack and receive messages 914 in response to the API calls 912, consistent with some embodiments. In various embodiments, any client device, any server computer of a server system, or any other device described herein may operate using elements of the software architecture 902. An EDA computing device described herein may additionally be implemented using aspects of the software architecture 902, with the software architecture 902 adapted for operating to perform clock tap to clock pin assignment in any manner described herein.

In some embodiments, an EDA application of the applications 910 performs clock tap to clock pin assignment according to embodiments described herein using various modules within the software architecture 902. For example, in some embodiments, an EDA computing device similar to the machine 1000 includes the memory 1030 and the one or more processors 1010. The processors 1010 also implement a clock tap (to clock pin) assignment based on connectivity module 942 for assigning clock taps to clock pins of circuit devices based on connectivity between circuit devices of a circuit design in accordance with various embodiments described herein.

In various other embodiments, rather than being implemented as modules of the one or more applications 910, the clock tap assignment based on connectivity module 942 may be implemented using elements of the libraries 906, the operating system 904, or the software frameworks 908.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 such as libraries of blocks for use in an EDA environment or other libraries that can provide functions such as memory allocation functions, string manipulation functions, mathematic functions, and the like. In addition, the libraries 906 can include API libraries 932 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 906 may also include other libraries 934.

The software frameworks 908 provide a high-level common infrastructure that can be utilized by the applications 910, according to some embodiments. For example, the software frameworks 908 provide various graphic user interface (GUI) functions, high-level resource management, high-level location services, and so forth. The software frameworks 908 can provide a broad spectrum of other APIs that can be utilized by the applications 910, some of which may be specific to a particular operating system 904 or platform. In various embodiments, the systems, methods, devices, and instructions described herein may use various files, macros, libraries, and other elements of an EDA design environment to implement clock tap to clock pin assignments based on connectivity as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 902, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1000 including processors 1010), with these operations being accessible via a network (e.g., the Internet) and via one or more appropriate interfaces (e.g., an API). In certain embodiments, for example, a client device may relay or operate in communication with cloud computing systems, and may access circuit design information in a cloud environment.

The performance of certain of the operations may be distributed among the processors, not only residing within a single machine 1000, but deployed across a number of machines 1000. In some embodiments, the processors 1010 or processor-implemented modules are located in a single geographic location (e.g., within a home environment, an office environment, or a server farm). In some other embodiments, the processors or processor-implemented modules are distributed across a number of geographic locations.

Figure 10:
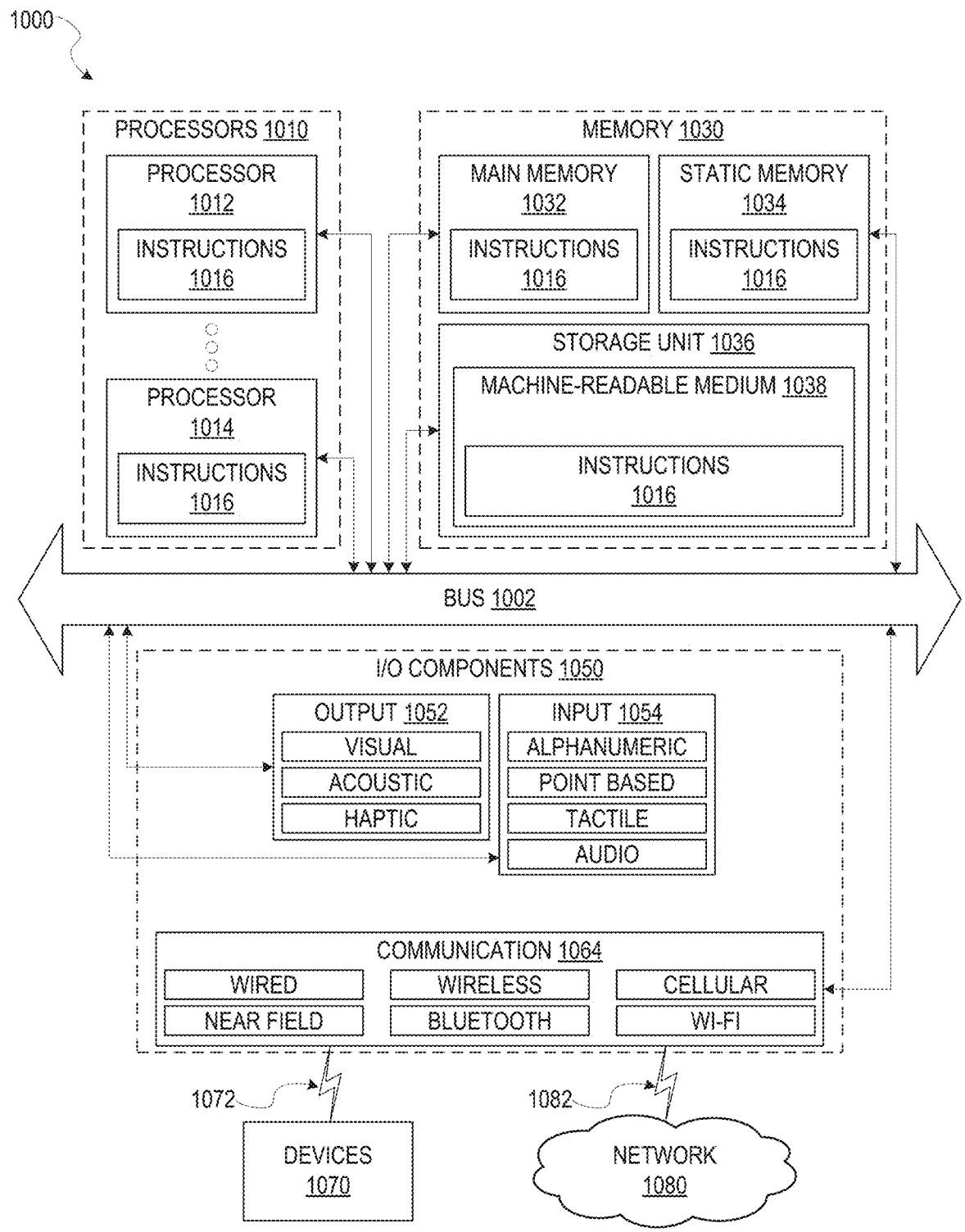
FIG. 10 is a diagram representing a machine in the form of a computer system within which a set of instructions are executed, causing the machine to perform any one or more of the methods discussed herein, according to some embodiments.

FIG. 10 is a diagrammatic representation of the machine 1000 in the form of a computer system within which a set of instructions may be executed for causing the machine 1000 to perform any one or more of the methodologies discussed herein, according to some embodiments. FIG. 10 shows components of the machine 1000, which is, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In some embodiments, the processors 1010 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute the instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1010 with a single core, multiple processors 1010 with multiple cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown, in some embodiments, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., the instructions 1016) for execution by a machine (e.g., the machine 1000), such that the instructions, when executed by one or more processors of the machine (e.g., the processors 1010), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, the communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine or any of a wide variety of peripheral devices (e.g., a peripheral device coupled via a USB).

In various embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling.

Furthermore, the machine-readable medium 1038 is non-transitory (in other words, not having any transitory signals) in that it does not embody a propagating signal. However, labeling the machine-readable medium 1038 "non-transitory" should not be construed to mean that the machine-readable medium 1038 is incapable of movement; the machine-readable medium 1038 should be considered as being transportable from one physical location to another. Additionally, since the machine-readable medium 1038 is tangible, the machine-readable medium 1038 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to some embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A method comprising:
  accessing, by a hardware processor, initial clock tap assignment data that describes an initial set of assignments between a set of clock taps of a circuit design and a set of clock pins of the circuit design;
  accessing, by the hardware processor, connectivity data that describes a set of data path connections between a plurality of circuit devices of the circuit design associated with the set of clock pins;
  accessing, by the hardware processor, common path pessimism removal data that comprises common path pessimism removal information for the circuit design;
  generating, by the hardware processor, a set of scores for the initial set of assignments by scoring each given assignment, in the initial set of assignments, based on the connectivity data and the common path pessimism removal data, the given assignment assigning a first tap in the set of clock taps to a first pin in the set of clock pins, the first pin being associated with a first circuit device of the circuit design, the scoring the given assignment based on the common path pessimism removal data comprising:
    generating a score for the given assignment based on common path pessimism removal information associated with the first tap and each other tap, in the set of clock taps, that is assigned to another circuit device of the circuit design connected to the first circuit device; and
  generating, by the hardware processor, a modified set of assignments between the set of clock taps and the set of clock pins based on the initial set of assignments and the set of scores.

2. The method of claim 1, wherein the connectivity data further describes a timing graph for the plurality of circuit devices.

3. The method of claim 1, wherein the connectivity data comprises slack information for the set of data path connections.

4. The method of claim 3, wherein the given assignment assigns a first tap in the set of clock taps to a first pin in the set of clock pins, wherein the first pin is associated with a first circuit device of the circuit design, and wherein the scoring the given assignment based on the connectivity data comprises:

generating a score for the given assignment based on slack information for each data path connection between the first circuit device and another circuit device of the circuit design.

5. The method of claim 1, further comprising:

prior to accessing the connectivity data, generating, by the hardware processor, at least a portion of the connectivity data by performing a timing analysis on a clock tree of the circuit design, the clock tree being generated based on the initial set of assignments.

6. The method of claim 1, further comprising:

prior to accessing the common path pessimism removal data, generating, by the hardware processor, the common path pessimism removal information based on a clock tree of the circuit design, the clock tree being generated based on the initial set of assignments.

7. The method of claim 1, further comprising:

generating, by the hardware processor, a clock tree for the circuit design based on the modified set of assignments.

8. A device comprising:

a memory storing instructions; and a hardware processor communicatively coupled to the memory and configured by the instructions to perform operations comprising:

accessing initial clock tap assignment data that describes an initial set of assignments between a set of clock taps of a circuit design and a set of clock pins of the circuit design;

accessing common path pessimism removal data that comprises common path pessimism removal information for the circuit design;

generating a set of scores for the initial set of assignments by scoring each given assignment, in the initial set of assignments, based on the common path pessimism removal data, the given assignment assigning a first tap in the set of clock taps to a first pin in the set of clock pins, the first pin being associated with a first circuit device of the circuit design, the scoring the given assignment based on the common path pessimism removal data comprising:

generating a score for the given assignment based on common path pessimism removal information associated with the first tap and each other tap, in the set of clock taps, that is assigned to another circuit device of the circuit design connected to the first circuit device; and generating a modified set of assignments between the set of clock taps and the set of clock pins based on the initial set of assignments and the set of scores.

9. The device of claim 8, wherein the operations further comprise:

prior to accessing the common path pessimism removal data, generating the common path pessimism removal information based on a clock tree of the circuit design, the clock tree being generated based on the initial set of assignments.

10. The device of claim 8, wherein the operations further comprise:

accessing connectivity data that describes a set of data path connections between a plurality of circuit devices of the circuit design associated with the set of clock pins, wherein the scoring each given assignment in the initial set of assignments is further based on the connectivity data.

11. The device of claim 10, wherein the connectivity data further describes a timing graph for the plurality of circuit devices.

12. The device of claim 10, wherein the connectivity data comprises slack information for the set of data path connections.

13. The device of claim 12, wherein the given assignment assigns a first tap in the set of clock taps to a first pin in the set of clock pins, wherein the first pin is associated with a first circuit device of the circuit design, and wherein the scoring the given assignment based on the connectivity data comprises:

generating a score for the given assignment based on slack information for each data path connection between the first circuit device and another circuit device of the circuit design.

14. The device of claim 10, wherein the operations further comprise:

prior to accessing the connectivity data, generating at least a portion of the connectivity data by performing a timing analysis on a clock tree of the circuit design, the clock tree being generated based on the initial set of assignments.

15. The device of claim 8, wherein the operations further comprise:

generating a clock tree for the circuit design based on the modified set of assignments.

16. A non-transitory computer-readable medium comprising instructions that, when executed by a hardware processor of a device, cause the device to perform operations comprising:

accessing initial clock tap assignment data that describes an initial set of assignments between a set of clock taps of a circuit design and a set of clock pins of the circuit design;

accessing connectivity data that describes a set of data path connections between a plurality of circuit devices of the circuit design associated with the set of clock pins;

accessing common path pessimism removal data that comprises common path pessimism removal information for the circuit design;

generating a set of scores for the initial set of assignments by scoring each given assignment, in the initial set of assignments, based on the connectivity data and the common path pessimism removal data, the given assignment assigning a first tap in the set of clock taps to a first pin in the set of clock pins, the first pin being associated with a first circuit device of the circuit design, the scoring the given assignment based on the common path pessimism removal data comprising:

generating a score for the given assignment based on common path pessimism removal information associated with the first tap and each other tap, in the set of clock taps, that is assigned to another circuit device of the circuit design connected to the first circuit device; and generating a modified set of assignments between the set of clock taps and the set of clock pins based on the initial set of assignments and the set of scores.

17. The non-transitory computer-readable medium of claim 16, wherein the operations further comprise:

generating a clock tree for the circuit design based on the modified set of assignments.

18. The non-transitory computer-readable medium of claim 16, wherein the operations further comprise:
  prior to accessing the common path pessimism removal data, generating, by the hardware processor, the common path pessimism removal information based on a clock tree of the circuit design, the clock tree being generated based on the initial set of assignments.

19. The non-transitory computer-readable medium of claim 16, wherein the connectivity data further describes a timing graph for the plurality of circuit devices.

20. The non-transitory computer-readable medium of claim 16, wherein the connectivity data comprises slack information for the set of data path connections.

* * * * *